United States Patent
Bahl et al.

(10) Patent No.: US 8,358,975 B2
(45) Date of Patent: Jan. 22, 2013

(54) SIGNALING OVER CELLULAR NETWORKS TO REDUCE THE WI-FI ENERGY CONSUMPTION OF MOBILE DEVICES

(75) Inventors: Paramvir Bahl, Issaquah, WA (US); Alastair Wolman, Seattle, WA (US); Ranveer Chandra, Kirkland, WA (US); Kevin Chin, Bellevue, WA (US); Yuvraj Agarwal, San Diego, CA (US)

(73) Assignee: Microsoft Corporation, Redmond, WA (US)

(*) Notice: Subject to any disclaimer, the term of this patent is extended or adjusted under 35 U.S.C. 154(b) by 979 days.

(21) Appl. No.: 11/964,173

(22) Filed: Dec. 26, 2007

(65) Prior Publication Data

US 2008/0248749 A1 Oct. 9, 2008

Related U.S. Application Data

(63) Continuation of application No. 11/697,263, filed on Apr. 5, 2007.

(51) Int. Cl.
*H04B 5/00* (2006.01)

(52) U.S. Cl. ....... 455/41.2; 455/522; 455/415; 455/574; 370/328; 370/338

(58) Field of Classification Search ............... 455/41.2, 455/90.2, 127.1–127.5, 343.1–343.6, 522, 455/415, 518–520, 419–422.1, 432.1, 436, 455/442, 500, 552.1, 571–574, 127.1–127.5; 370/311, 318, 216–266, 310, 313, 348, 332, 370/338, 389
See application file for complete search history.

(56) References Cited

U.S. PATENT DOCUMENTS

| | | |
|---|---|---|
| 6,985,755 B2 | 1/2006 | Cadieux et al. |
| 7,020,480 B2 | 3/2006 | Coskun et al. |
| 7,103,344 B2 | 9/2006 | Menard |
| 7,684,783 B1* | 3/2010 | Vacon et al. ............. 455/410 |
| 2003/0035520 A1 | 2/2003 | Cannon et al. |
| 2004/0233930 A1 | 11/2004 | Colby, Jr. |
| 2004/0252053 A1 | 12/2004 | Harvey |
| 2005/0048958 A1* | 3/2005 | Mousseau et al. ............. 455/415 |
| 2005/0147049 A1 | 7/2005 | Ganesan |
| 2005/0154933 A1 | 7/2005 | Hsu et al. |
| 2005/0170779 A1 | 8/2005 | Tangonan et al. |
| 2005/0215274 A1 | 9/2005 | Matson et al. |
| 2005/0249225 A1 | 11/2005 | Singhal |
| 2005/0286466 A1 | 12/2005 | Tagg et al. |
| 2006/0003758 A1 | 1/2006 | Bishop et al. |
| 2006/0119508 A1 | 6/2006 | Miller |
| 2006/0120377 A1 | 6/2006 | Caballero-McCann et al. |
| 2006/0274764 A1 | 12/2006 | Mah et al. |
| 2006/0286984 A1 | 12/2006 | Bonner |

(Continued)

OTHER PUBLICATIONS

Tsao et al., "Reducing Idle Mode Power Consumption of Cellular/VoWLAN Dual Mode Mobiles", Global Telecommunication Conference, vol. 5. pp. #2902-pp. #2906.

(Continued)

*Primary Examiner* — Chuong A Ngo
(74) *Attorney, Agent, or Firm* — Lee & Hayes, PLLC (57) ABSTRACT

Techniques for increasing the battery life on a mobile device by decreasing the energy consumption of the mobile device's wireless fidelity (Wi-Fi) interface are described. In one embodiment, the mobile device's Wi-Fi interface is automatically disabled when the device is not engaged. When the device receives a wake up call from a server via its Cellular interface, the Wi-Fi interface is enabled if the device answers the wake up call and the Wi-Fi interface is available. Using its Wi-Fi interface, the mobile device then connects to an IP-based network via a Wi-Fi access point.

16 Claims, 6 Drawing Sheets

U.S. PATENT DOCUMENTS

| | | | |
|---|---|---|---|
| 2007/0060125 A1 | 3/2007 | Rahim | |
| 2007/0067443 A1* | 3/2007 | Seligmann et al. | 709/224 |
| 2007/0140157 A1* | 6/2007 | Fu et al. | 370/318 |
| 2008/0051130 A1 | 2/2008 | Juneja et al. | |
| 2008/0113692 A1 | 5/2008 | Zhao et al. | |
| 2008/0200166 A1 | 8/2008 | McCamon | |

OTHER PUBLICATIONS

PCT Search Report from Application No. PCT/2008/059514, mailed on Jun. 17, 2009, 13 pages.

Anastasi, et al., "Experimental Analysis of an Application-independent Energy Management Policy for Wi-Fi Hotspots", available at least as early as Jan. 18, 2007, at <<http://www.cl.cam.ac.uk/~ap458/docs/iscc04.pdf>>, pp. 1-6.

Pering, et al., "CoolSpots: Reducing the Power Consumption of Wireless Mobile Devices with Multiple Radio Interfaces", available at least as early as Jan. 18, 2007, at <<http://mesl.ucsd.edu/pubs/pering_mobisys06.pdf>>, ACM, 2006, pp. 1-13.

Shih, et al., "Wake on Wireless: An Event Driven Energy Saving Strategy for Battery Operated Devices", available at least as earlyl as Jan. 18, 2007, at <<http://circuit.ucsd.edu/~curts/courses/ECE284_F06/references/Shi02.pdf>>, ACM, 2006, pp. 1-12.

Office Action for U.S. Appl. No. 11/697,263, mailed on Dec. 29, 2011, Paramvir Bahl, "Signaling Over Cellular Networks to Reduce the Wi-Fi Energy Consumption of Mobile Devices", 18 pgs.

Office Action for U.S. Appl. No. 11/697,263, mailed on Apr. 29, 2011, Paramvir Bahl, "Signaling Over Cellular Networks to Reduce the Wi-Fi Energy Consumption of Mobile Devices".

Office Action for U.S. Appl. No. 11/697,263, mailed on Jul. 22, 2011, Paramvir Bahl, "Signaling Over Cellular Networks to Reduce the Wi-Fi Energy Consumption of Mobile Devices".

* cited by examiner

SIGNALING OVER CELLULAR NETWORKS TO REDUCE THE WI-FI ENERGY CONSUMPTION OF MOBILE DEVICES

RELATED APPLICATIONS

This application is a continuation of and claims priority to U.S. patent application Ser. No. 11/697,263 filed on Apr. 5, 2007, which is incorporated by reference herein.

BACKGROUND

The use of Internet Protocol (IP)—based networks to transmit data, such as electronic mail (e-mail), facsimiles (e-faxes) and voice communication, is becoming increasingly prevalent. With respect to voice communication in particular, voice over Internet Protocol (VoIP) allows voice communication to be sent over IP-based networks by digitizing voice data into packets and then sending them using IP-based routing. In this regard, VoIP communication can be thought of as the digital counterpart to traditional switch-based communication services, such as the public switched telephone network (PSTN). VoIP communication is rapidly gaining acceptance over traditional switch-based communication services for several reasons. For instance, unlike traditional switch-based communication, VoIP does not require a complex switching infrastructure and is therefore considerably less expensive to implement. Furthermore, VoIP allows a single network to carry both voice and data, which can be financially beneficial to users having existing underutilized network capacity. For individuals, VoIP provides extremely low cost calling rates for services such as long distance calling. For enterprises, VoIP provides new functionality, especially when integrated with wireless fidelity (Wi-Fi) networks. This includes improved caller routing/tracking and integration with services such as addressing, in-call file exchanging, video conferencing and call logging.

In addition, mobile devices that combine mobile computing functionality with mobile phone functionality, such as smartphones, personal digital assistant (PDA) phones and the like, are also becoming increasingly popular. These devices typically implement a full-featured compact operating system, such as Windows CE®, Palm OS®, or Symbian OS®, and are usually equipped with multiple wireless network interfaces—including a cellular interface (provided by a cellular radio on the device) and wireless fidelity (Wi-Fi) interface (provided by a Wi-Fi radio on the device).

As mobile devices become ubiquitous, they are increasingly being used to send and receive data via their cellular and Wi-Fi interfaces. In this regard, Wi-Fi interfaces offer several advantages over cellular interfaces with respect to communication over IP-based networks. For instance, with real-time applications such as VoIP, jitter and loss rate are higher on cellular interfaces than Wi-Fi interfaces. Furthermore, when engaged in data transmission, Wi-Fi radios on mobile devices are more energy efficient than cellular data radios. In other words, cellular interfaces on mobile computing devices consume more power when transmitting data than Wi-Fi interfaces do. This is important because mobile devices typically rely on batteries as their main source of power.

There are other reasons why Wi-Fi interfaces are advantageous for IP-based communication. For instance, cellular network providers usually require that a user purchase a cellular data plan, which is typically expensive, in order to use the cellular network for data transmission. For certain real-time applications such as VoIP that produce significant network traffic, cellular network providers usually require an even more costly unlimited cellular data plan.

One disadvantage of using Wi-Fi interfaces, however, at least on mobile devices, is that such interfaces can be costly in terms of power usage (and thus battery life) to keep idle (connected to a network but not engaged in data transmission). This is because Wi-Fi interfaces continually scan for wireless network activity, even when they are idle. Therefore, from an energy consumption perspective, the battery life (between charges) of a mobile device is significantly reduced when its Wi-Fi interface is enabled (Wi-Fi radio powered on). This can make it impractical to use Wi-Fi interfaces for certain real-time applications, such as VoIP, which require an interface to remain enabled and idle in case transmitted data is sent to the mobile device.

Accordingly, there is a need to minimize the energy consumption of a Wi-Fi interface on a mobile device running real-time applications, such as VoIP, e-mail or instant messenger, while still allowing for the advantages associated with using the Wi-Fi interface to be leveraged.

SUMMARY

Techniques for increasing the battery life on a mobile device by decreasing the energy consumption of the mobile device's wireless fidelity (Wi-Fi) interface are described. In one embodiment, a mobile device's Wi-Fi interface is automatically disabled when the device is not engaged in a voice over internet protocol (VoIP) call via the Wi-Fi interface. When a VoIP call is initiated on the device, or when the device receives a wake up signal via its cellular interface, the Wi-Fi interface is automatically enabled. The wake up signal is made by one or more servers in response to an incoming VoIP call or any other notification directed to the mobile device, such as a new e-mail or instant messaging update for example. Using its enabled Wi-Fi interface, the mobile device connects to an IP-based network via a Wi-Fi access point. In the case of VoIP, the one or more servers then initiate a direct call, wherein VoIP technology is used by the mobile device, between the mobile device and a VoIP calling device. The VoIP calling device can be a PSTN phone communicating via the VoIP server. Finally, the Wi-Fi interface is disabled when the call is finished. In this manner, the mobile device can conserve power by disabling the Wi-Fi interface when it is not in use—while still enjoying the advantages that Wi-Fi provides with respect to communicating over an IP-based network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure is directed to energy management techniques for a mobile device utilizing a Wi-Fi interface. These techniques generally involve increasing the battery life on a mobile device by decreasing the energy consumption of the wireless fidelity (Wi-Fi) interface on the mobile device. More particularly, the disclosed energy management techniques generally involve disabling a Wi-Fi interface on a mobile device when it is not needed. This can be accomplished by powering off the device's Wi-Fi radio (thus disabling the Wi-Fi interface) unless the Wi-Fi interface is being used to communicate with a wireless access point associated with an Internet Protocol (IP)-based network. Furthermore, the Wi-Fi radio can be powered on (thus enabling the Wi-Fi interface) when a call is initiated on the mobile device or when the mobile device receives a wake up signal via its cellular interface. This disabling and enabling in response to receiving a wake up signal can be accomplished automatically without a user's participation. In other words, a user is not required to interact with the mobile device to manually disable or enable (power the Wi-Fi radio off or power on) the Wi-Fi interface each time a wake up signal is received.

In one embodiment, a Wi-Fi interface on a mobile device is disabled when the mobile device is not engaged in a voice over internet protocol (VoIP) call via the Wi-Fi interface. When a VoIP call is initiated on the device, or when the device receives a wake up signal via a cellular interface on the mobile device, the Wi-Fi interface is enabled. This wake up signal is made by one or more servers in response to an incoming VoIP call directed to the mobile device. Once the mobile device enables its Wi-Fi interface and associates with a Wi-Fi network, the one or more servers initiate a direct call, wherein VoIP technology is used by the mobile device, between the mobile device and a VoIP calling device. Finally, the Wi-Fi interface is disabled when the call ends.

Multiple and varied implementations and embodiments are described below. In the following section, an exemplary mobile device that is suitable for practicing various implementations is discussed. After this discussion, representative implementations of processes, devices, and systems for implementing the disclosed energy management techniques are described.

Exemplary Mobile Device

Figure 1:
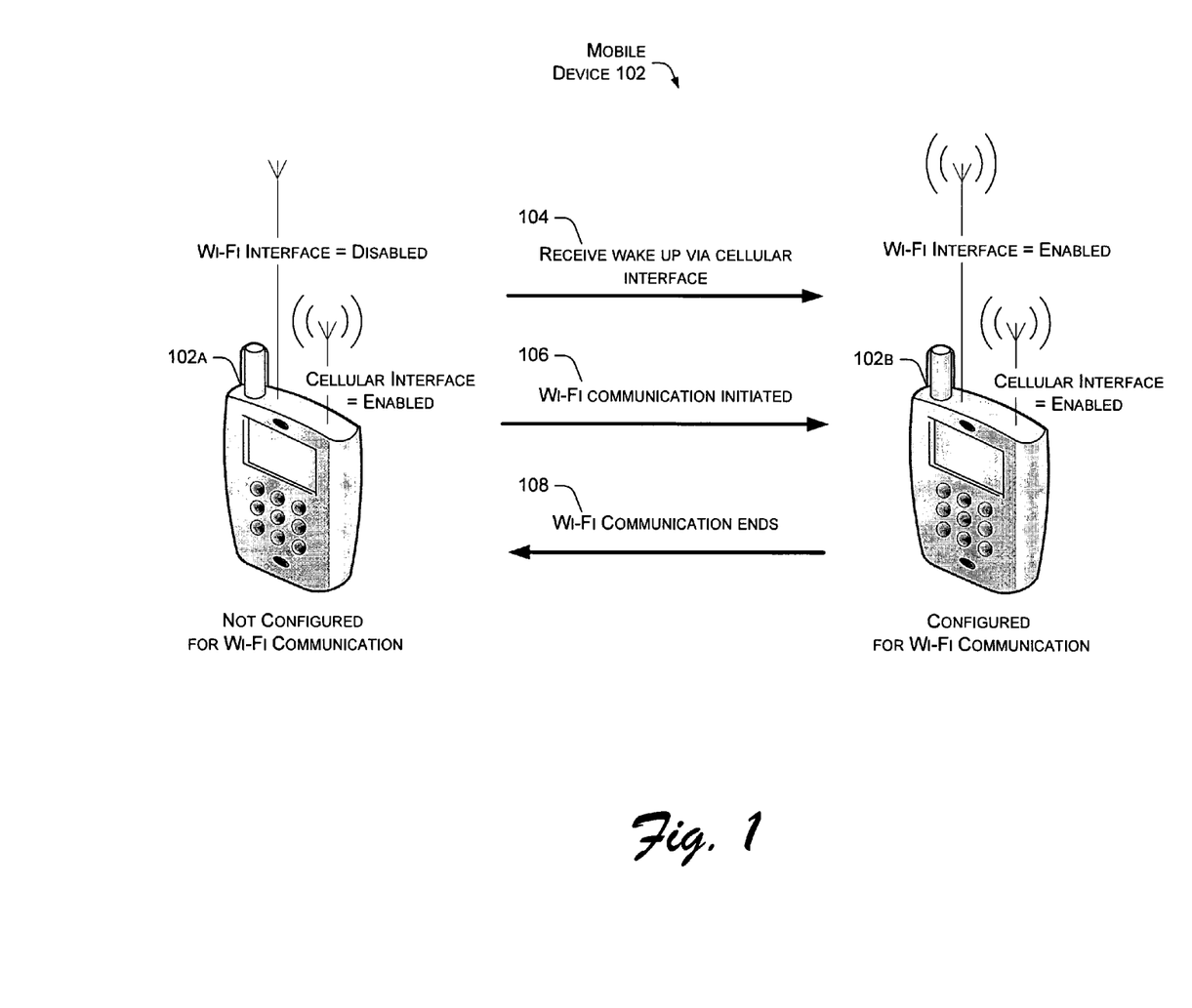
FIG. 1 illustrates an exemplary device when its Wi-Fi interface is disabled and when its Wi-Fi interface is enabled, in accordance with one embodiment.

FIG. 1 illustrates an exemplary mobile device 102 in two distinct configurations. Specifically, in configuration 102a, the Wi-Fi interface (and thus the Wi-Fi radio) is disabled and therefore unable to communicate with a Wi-Fi access point, if available. However, in configuration 102b, the computing device 102 is configured for Wi-Fi communication because the Wi-Fi interface (and thus the Wi-Fi radio) is enabled and therefore able to communicate with a Wi-Fi access point. Note that in both the configurations 102a and 102b, the cellular interface is enabled.

FIG. 1 also depicts two events that can change the computing device's configuration from Wi-Fi disabled in 102a to Wi-Fi enabled in 102b and one event that can change it from Wi-Fi enabled in 102b to Wi-Fi disabled in 102a. Specifically, in event 104, the mobile device 102 receives a wake up signal via its cellular interface. As will be explained in detail below, this wake up signal can be initiated by any suitable source and can be in response to an event such as an incoming VoIP call, electronic mail (e-mail), or electronic facsimile (e-fax). In response to this wake up signal, the Wi-Fi interface is automatically enabled by the mobile device 102 such that it becomes configured for Wi-Fi communication. In this regard, a user of the mobile device 102 does not need to be aware or notified of the incoming wake up signal, or manually participate in enabling the mobile device 102.

In event 106, the Wi-Fi interface is enabled when Wi-Fi communication is initiated on the mobile device 102. Wi-Fi communication can be initiated by any suitable means. For instance, this might entail the user of the mobile device 102 interacting with the device to activate the Wi-Fi interface and thus configure the mobile device 102 for Wi-Fi communication.

Finally, in event 108, the Wi-Fi interface is disabled when Wi-Fi communication ends on the mobile device 102. Accordingly, while the mobile device's cellular interface stays enabled (even while idle), its Wi-Fi interface is enabled when it is needed and otherwise disabled. In this regard, the user of the mobile device 102 does not need to manually participate in disabling the Wi-Fi interface. As explained above, this can dramatically decrease the mobile device's energy consumption, and thus increase its battery life, because it is extremely costly in terms of power to keep the Wi-Fi interface enabled continuously. At the same time, the advantages of Wi-Fi communication with respect to IP-based communication are realized because the Wi-Fi interface is still available when it is needed.

Exemplary Process on a Mobile Device

Figure 2:
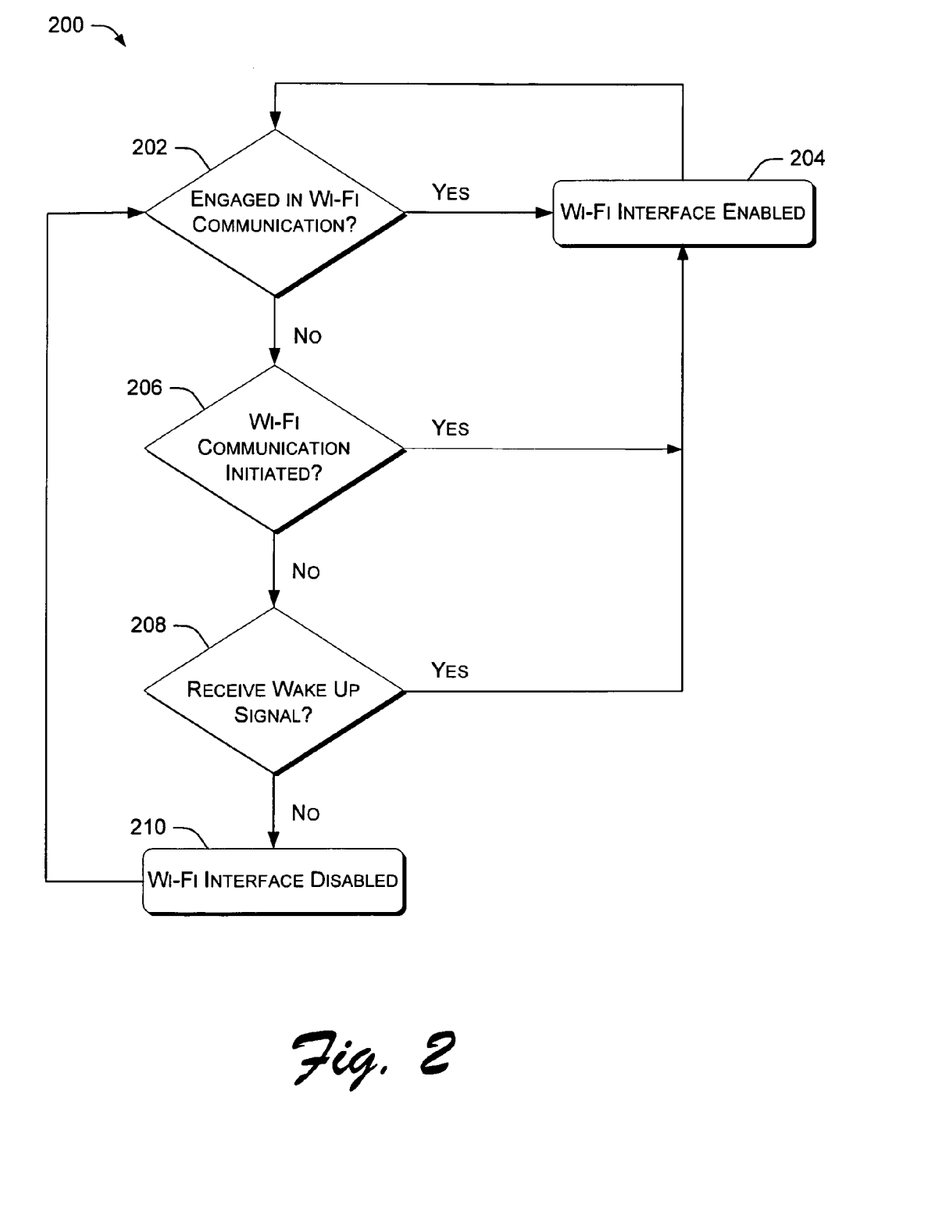
FIG. 2 is a flow diagram illustrating an exemplary process for implementing energy management techniques on a mobile device.

FIG. 2 illustrates an exemplary process 200 for implementing energy management techniques on a mobile device, such as mobile device 102 depicted in FIG. 1, having a Wi-Fi interface and a cellular interface. Process 200 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. The order in which this process is described is not intended to be construed as a limitation, and any number of the described blocks can be combined in any order to implement the process, or an alternate process. Additionally, individual blocks may be deleted from the process without departing from the spirit and scope of the subject matter described herein.

At block 202, a determination is made whether the mobile device is engaged in Wi-Fi communication. For the purposes of this discussion, this involves the mobile device sending and/or receiving IP-based data packets, such as VoIP packets, via its Wi-Fi interface. If the mobile device is engaged in Wi-Fi communication ("Yes"), the Wi-Fi interface remains enabled at block 204 to allow the mobile device to continue sending and/or receiving IP-based data packets.

If the mobile device is not engaged in Wi-Fi communication ("No"), block 206 determines whether Wi-Fi communication is being initiated on the mobile device. As noted above, this can be accomplished by any suitable means, such as by a user interacting with the mobile device via one or more software controls on a user interface and/or via one or more hardware controls on the computing device. If Wi-Fi communication is being initiated on the mobile device ("Yes"), the Wi-Fi interface is enabled at block 204 to allow the mobile device to engage in IP-based communication by associating/authenticating with an IP-based network accessible via a Wi-Fi access point.

If Wi-Fi communication is not being initiated on the mobile device ("No"), block 208 determines whether the mobile device is receiving a wake up signal. As explained above, this wake up signal is received by the mobile device via its cellular interface and can be initiated by any suitable source which has received an IP-based communication request directed to the mobile device. For instance, in at least some embodiments, the source is a server device which has received an incoming VoIP call directed to the mobile device. If the mobile device is receiving a wake up signal ("Yes"), the Wi-Fi interface is enabled at block 204 to allow the mobile device to engage in IP-based communication by associating/authenticating with an IP-based network accessible via a Wi-Fi access point.

In one embodiment the wake up signal can be sent as a call on the cellular interface of the mobile device with a special caller ID. In another embodiment, the wake up signal can be sent by a special data packet on the cellular data interface of the mobile device.

If the mobile device is not receiving a wake up signal ("No"), the Wi-Fi interface is disabled at block 210 to prevent it from consuming energy while idle (connected to a network but not engaged in data transmission). Recall that the cellular interface, which requires considerably less energy when idle, remains enabled and provides the means by which the mobile device is able to receive wake up signals.

Finally, note that after block 204 or block 210 is performed, block 202 is repeated. As a result, the process implements energy saving management techniques by disabling the mobile device's Wi-Fi interface unless/until it is needed. As noted above, this increases the mobile device's battery life by minimizing the energy consumption of the (Wi-Fi) interface.

Exemplary Devices and System

Figure 3:
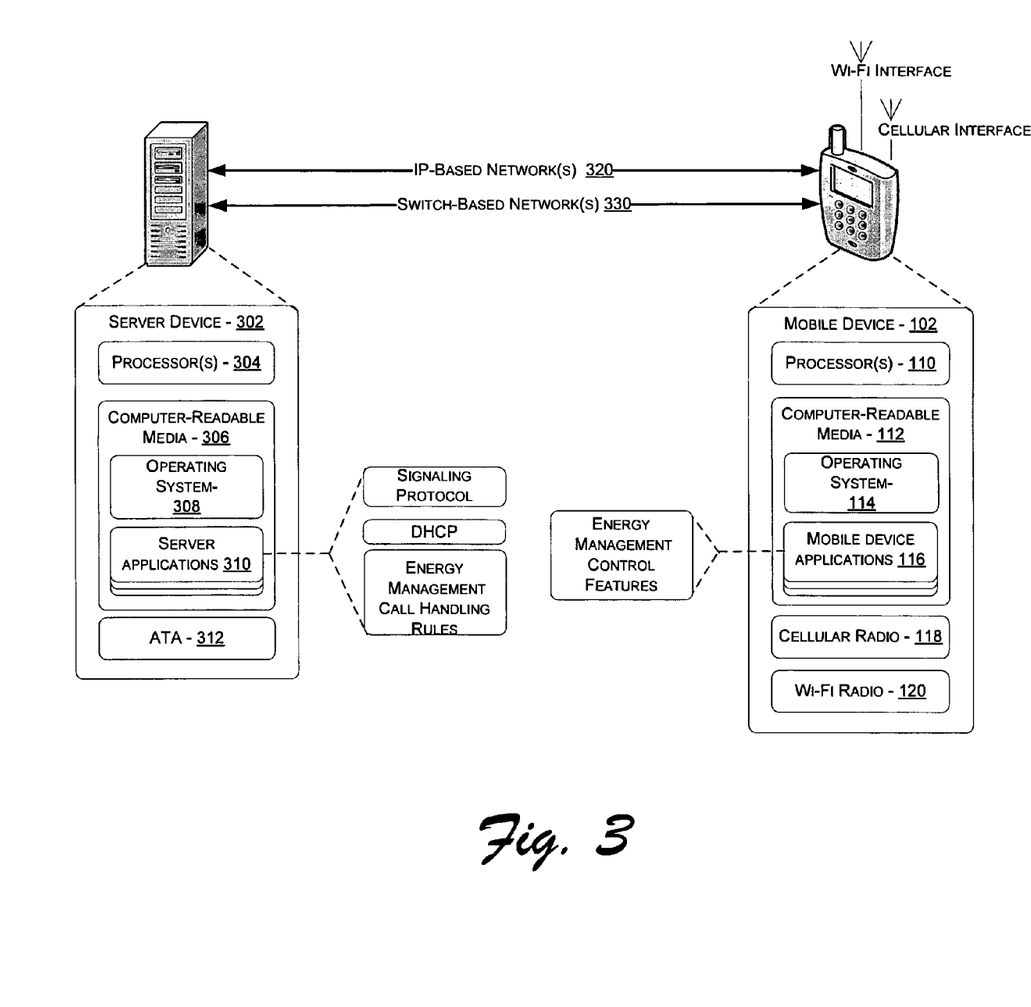
FIG. 3 is a high level diagram illustrating exemplary devices for implementing the disclosed energy management techniques.

FIG. 3 illustrates exemplary devices for implementing the disclosed energy management techniques. While these devices are described in the context of transmitting VoIP data, it is to be appreciated and understood that this constitutes but one example and is not to be used to limit the application of the claimed subject matter. Rather, these devices can be employed in other contexts, such as e-mail, presence updates for chat software and e-faxes, without departing from the spirit and scope of the claimed subject matter.

For the purpose of this discussion, a server device 302 and a mobile device 102 are communicatively coupled via one or more IP-based networks 320 capable of routing VoIP calls. The IP-based network(s) 320 can be any suitable IP-based communication network capable of routing IP-based data (e.g. VoIP calls), such as a local area network (LAN), wide area network (WAN), or the Internet. The mobile device accesses the IP-based network(s) 320 through its Wi-Fi interface when available. The mobile device can also access the IP-based network using its cellular data interface, if available. In addition, the server device 302 and the mobile device 102 may be communicatively coupled via one or more switch-based networks 330, such as the PSTN. The mobile device 102 accesses the switch-based network(s) 330 through its cellular interface which receives and sends calls via a cellular base station that is associated with a cellular network, when available.

The server device 302 may be implemented as one or more of a variety of suitable computing devices, including, for example, servers, desktop PCs, notebooks or portable computers, workstations, mainframe computers, and the like. The server device 302 includes one or more processors 304 and one or more computer-readable media 306. In addition, residing on the computer-readable media 306 is an operating system 308 and one or more software server applications 310, both of which are executable by the processor(s) 304. Finally, the server device 302 may include an analog telephony adapter (ATA) 312 to bridge (or in other words translate) calls between the switch-based network(s) 330 and the IP-based network(s) 320. As will be appreciated and understood by one skilled in the art, while the ATA 312 can take any suitable form, it is typically a hardware device communicatively coupled with other components of the server device 302.

The server applications 310 on the server device 302 include, among other things, a protocol server implementing a standardized application layer signaling protocol, such as session initiation protocol (SIP), H.323, or the like to coordinate (initiate and terminate) an IP-based communication session (here, a VoIP call) between calling parties. For purposes of this discussion, this protocol server can be thought of as a VoIP proxy server providing a rendezvous point for VoIP connections. To perform this coordination, the VoIP proxy server utilizes a VoIP proxy table which contains a record for each device or user registered with the VoIP proxy server, such as mobile device 102 for instance. Specifically, each record contains a unique identification for the device/user along with information such as their extension/contact information (e.g. VoIP extension, cell phone number, current IP address, etc) and special instructions (e.g. call handling rules, authentication information, passwords, etc).

In addition, the server applications 310 may include a dynamic host configuration protocol (DHCP) server to facilitate IP-based communication between various devices, such as between device 102 and another calling device connected to IP-based network(s) 320 for example. As will be appreciated and understood by one skilled in the art, DHCP is a set of rules that dynamically assigns/leases IP addresses and related information for temporarily connected devices to provide TCP/IP network configuration, prevent conflicts and centrally organize/manage IP address allocation.

the server applications 310 include certain energy management communication handling rules which, along with certain energy management control features (discussed below) on the mobile device 102, are used to implement the disclosed energy management techniques. Specifically, with respect to VoIP calling, these communication handling rules are call handling rules that are included in some or all of the registered device (or user) records discussed above. As such, these call handling rules can be thought of as being implemented at the application-level on the server device 302 to facilitate the energy management control features discussed below. In this regard, these rules can be added to existing VoIP proxies and/or updated/changed later by modifying a configuration file for the VoIP proxy server on the server device 102. This is advantageous because many existing commercial signaling protocols/VoIP Proxies implement rule-based call handling already. Accordingly, the disclosed energy management techniques can be implemented on an existing server device(s) without requiring any new hardware, infrastructure changes, or source code modifications. Futhermore, every registered device record does not have to be modified with these call handling rules, and devices associated with unmodified records are not affected.

By way of example and not limitation, Table 1 below lists a set of call handling rules (with corresponding descriptions)

that can be implemented on a server device already utilizing SIP signaling protocols, in accordance with one embodiment.

TABLE 1

| Call Handling Rule | Description |
|---|---|
| 1. Send ring tone to caller | Informs a VoIP caller that the call is being handled. |
| 2. Make call (wake up signal) to callee's registered cell phone. | Directs the callee (mobile device 102 for example) to enable its Wi-Fi interface and complete the call. |
| 3. Dial the VoIP extension of callee. Retry after timeout. | Attempts to connect the callee with the caller. It retries this step to account for variation in the time taken by the callee to connect to a Wi-Fi access point, associate/authenticate with an IP-based network, and obtain/lease an IP address using DHCP. |
| 4. Wait a few seconds for callee's response. | If there is no response from the callee, server sends back an invalid tone to the caller (or caller's voice mailbox). |
| 5. Hang up if no response from callee (or complete call over the cellular interface) | |

As noted above, the mobile device 102 may be implemented as any device that combines mobile computing functionality with mobile phone functionality, such as smartphones, PDA phones, or the like. Mobile device 102 includes one or more processors 110 and more computer-readable media 112. In addition, residing on the computer-readable media 112 is an operating system 114 and one or more software mobile device applications 116, both of which are executable by the one or more processors 304. For purposes of this discussion, operating system 114 can be though of as any mobile device compact operating system, such as Windows CE®, Palm OS®, Symbian OS®or the like capable of implementing the mobile device applications 116 such that the energy management control features discussed below are possible.

The mobile device applications 116 include, among other things, the energy management control features mentioned above. These features can be implemented at the user-level, i.e. on top of the operating system without modifying it. As but one example, these features can be implemented on a mobile device running the Microsoft Windows CE® operating system by simply modifying the connection manager. By way of example and not limitation, Table 2 below lists energy management control features (with corresponding descriptions) that can be implemented on a mobile device to accomplish the disclosed energy management techniques, in accordance with one embodiment.

Figure 4:
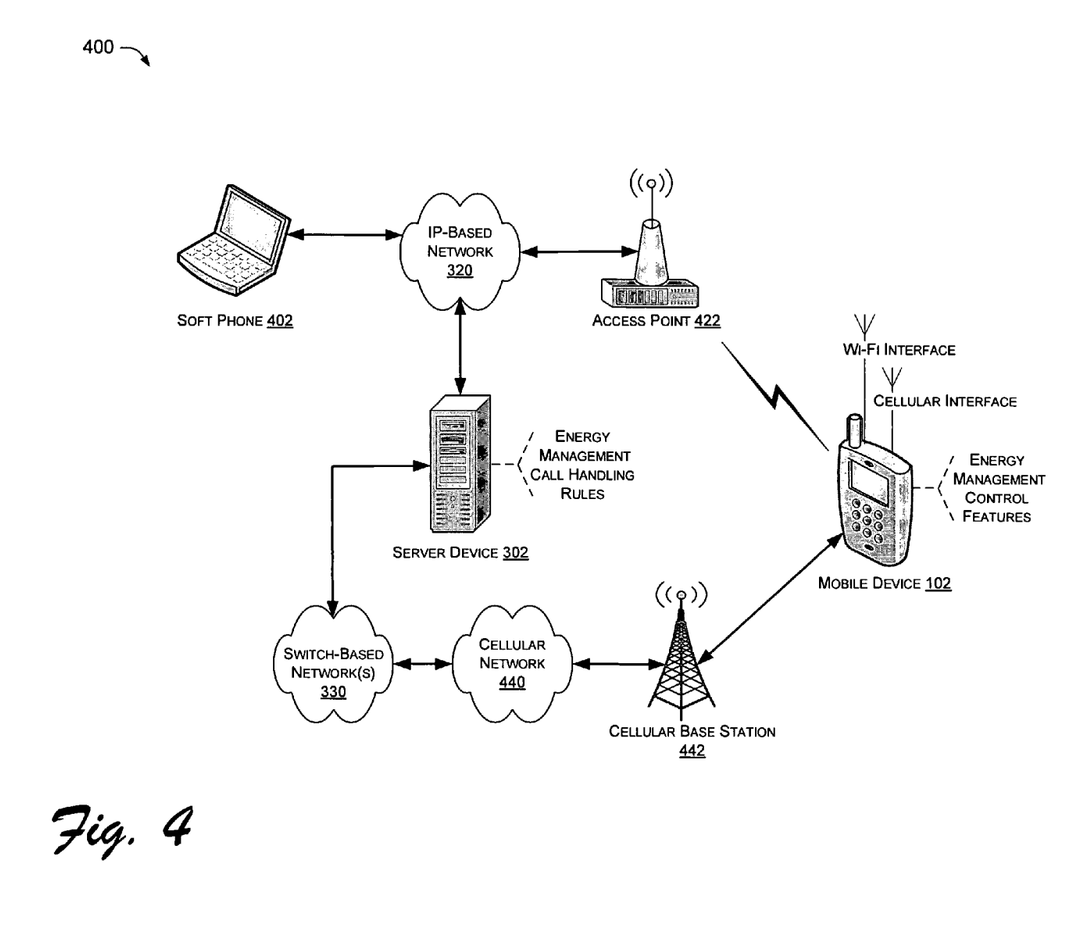
FIG. 4 illustrates an exemplary system for implementing the disclosed energy management techniques.

FIG. 4 illustrates an exemplary system 400 for implementing the disclosed energy management techniques. While the system 400 is described in the context of transmitting VoIP data, it is to be appreciated and understood that this constitutes but one example and is not to be used to limit the application of the claimed subject matter. Rather, as noted above, this system can be employed in other contexts, such as transmitting electronic e-mail and e-faxes, without departing from the spirit and scope of the claimed subject matter. For discussion purposes, system 400 is described with reference to the exemplary devices depicted in FIG. 3.

The system 400 includes a server device 302 with energy management call handling rules, as described above. As noted above, the server device 302 can be implemented as one or more of a variety of suitable computing devices. In addition, the system 400 includes a mobile device 102 with a Wi-Fi interface, cellular interface, and energy management control features, as described above. As noted above, the mobile device 102 may be implemented as any suitable device, such as a smartphone, PDA phone, or the like.

Recall that the server device 302 and the mobile device 102 are communicatively coupled via one or more IP-based networks, here depicted as IP-based network(s) 320. As noted above, the IP-based network(s) 320 can be any suitable IP-based communication network, such as a LAN, WAN or the internet. Continuing, access point 422 is shown as providing the mobile device 102 with wireless access (via the mobile device's Wi-Fi interface) to the IP-based network(s) 320. For the sake of clarity, access point 422 is shown here as a single access point currently available (within range, accessible, etc.) to the mobile device 102. However, it is to be appreciated and understood that the system 400 can include any number of access points, which may or may not be available to the mobile device 102 at any particular time, without deviating from the course and scope of the claimed subject matter.

Also recall that the server device 302 and a mobile device 102 may be communicatively coupled via one or more switch-based voice networks such as the PSTN, here depicted as switch-based network(s) 330. The mobile device 102 accesses the switch-based network(s) 330 through its cellular interface which receives and sends calls via a cellular base station, here depicted as cellular base station 442. Cellular base station 442, in turn, is associated with a cellular network, here depicted as cellular network 440. For the sake of clarity, cellular base station 442 and cellular network 440 are shown here as single entities currently available (within range, accessible, etc.) to mobile device 102. However, it is to be appreciated and understood that system 400 can include any number of cellular base stations and/or cellular networks

TABLE 2

| Energy Management Control Feature | Description |
|---|---|
| 1. Ability to distinguish a wake up call from a regular cellular call received via the cellular interface (or a data packet received over the cellular data interface) | When not recognized as a wake up call (or a wake up data packet), an incoming call (or packet) is treated as a regular cellular call. When it is recognized as a wake up signal, the features described below can be utilized. |
| 2. Ability to power on the Wi-Fi radio. | Powering on the Wi-Fi radio enables the Wi-Fi interface. |
| 3. Ability to control association and authentication with an IP-based network available via a Wi-Fi access point. | Association and authentication includes the process by which the mobile device gains wireless access to an IP-based network via a wireless access point. |
| 4. Ability to monitor traffic over the Wi-Fi interface so as to power off the Wi-Fi radio when a VoIP call ends. | Powering off the Wi-Fi radio disables the Wi-Fi interface. | which may or may not be available to the mobile device 102 at any particular time, without deviating from the course and scope of the claimed subject matter.

Finally, system 400 includes one or more devices, other then mobile device 102 and server device 302, which are capable of engaging (including initiating) a VoIP call. One such device is shown here as soft phone 402. For purposes of this discussion, soft phone 402 can be though of as a device, such as a personal computer (PC), personal digital assistant (PDA), cell phone, tablet computer, smart phone or the like that is capable of engaging in a direct call with the mobile device 102, wherein VoIP technology is used by the mobile device. While a soft phone is depicted/discussed in the context of this embodiment, it is to be appreciated and understood that any device capable of engaging (including initiating) a VoIP call can be implemented in other embodiments without departing from the spirit and scope of the claimed subject matter. In fact, the caller can be over a PSTN connection, and the translation from the switched network call to VoIP is done by the ATA.

Exemplary Process

Figure 5:
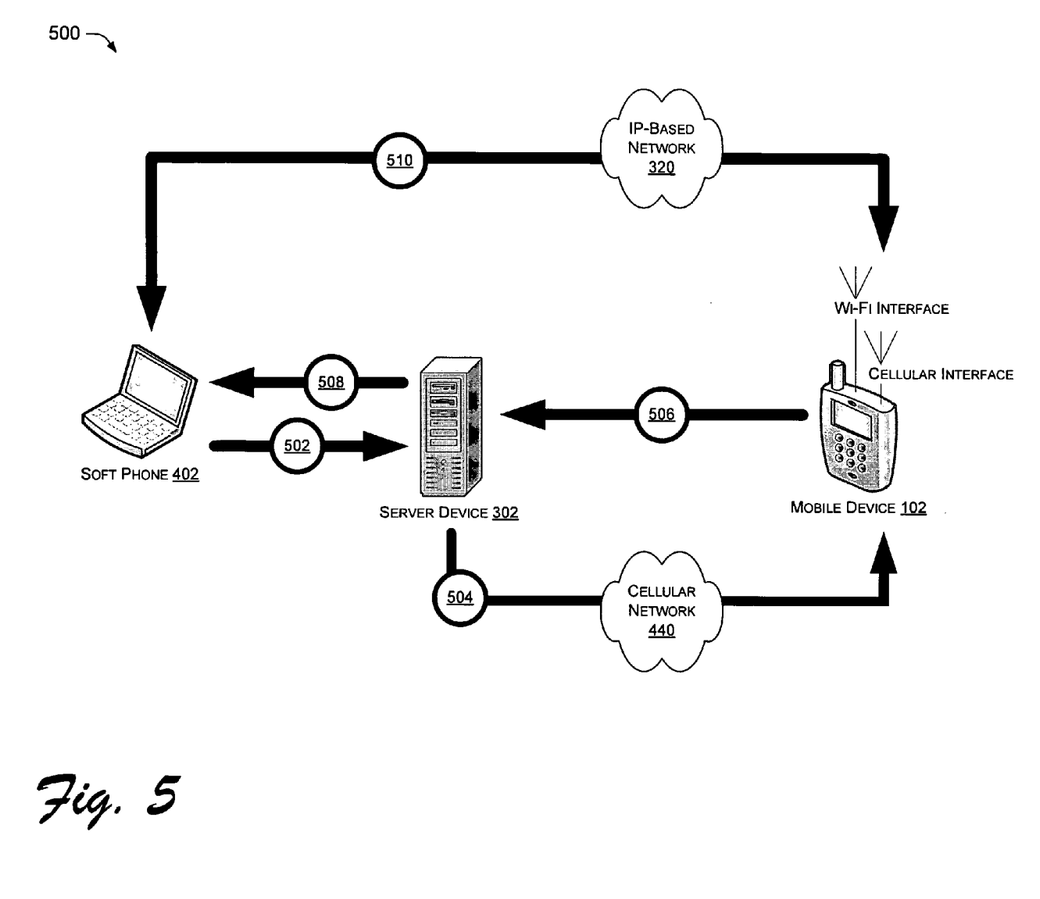
FIG. 5 illustrates an exemplary process for implementing the disclosed energy management techniques, in accordance with one embodiment.

FIG. 5 illustrates an exemplary process 500 for implementing the disclosed energy management techniques, in accordance with one embodiment. While this process is described in the context of transmitting VoIP data (VoIP calling), it is to be appreciated and understood that this constitutes but one example and is not to be used to limit the application of the claimed subject matter. Furthermore, while in this example, a call on the mobile device's cellular interface is used as the wake up signal to the mobile device, this should not to be construed as meaning that other wake up signals, such as a special data packet for instance, cannot be used in alternate embodiments without deviating from the spirit and scope of the claimed subject matter.

For discussion purposes, process 500 is described in the context of the system 400 above as a sequence of operations. Each operation is depicted as a darkened line with one end terminating in a directional pointer. Each operation can be implemented in hardware, software, or a combination thereof. In the context of software, the blocks represent computer instructions that, when executed by one or more processors, perform the recited operations.

Recall from above that the server device 302 includes energy management call handling rules which, along with the control features on the mobile device 102, are used to implement the disclosed energy management techniques. Furthermore, recall that these call handling rules can be found in some or all of the registered device (or user) records discussed above. Finally, recall that these records are found in the VoIP proxy table which contains a record for each device or user registered with the VoIP proxy server on the server device 302. Accordingly, in order for process 500 to be accomplished with respect to the mobile device 102, the mobile device 102 must be registered (termed device registration) with the VoIP proxy server on the server device 302.

The operation of device registration is not shown in FIG. 5. Nevertheless, a brief description is provided here to facilitate the reader in understanding this discussion. Device registration is performed when an administrator identifies a new mobile device which will utilize the services of a server device (with a VoIP server), such as server device 302, to engage in VoIP calls. During this registration, a new record is added to the VoIP proxy table of the server device. This record includes, among other things, a VoIP extension for the device and a cell phone number for the mobile device 102. This allows the VoIP extension to be mapped to the cell number, and vice versa.

In addition, a unique server identifier is generated which identifies the server device 302 and may be different for each mobile device registered with the server device 302 (and is thus unique to both the server device 302 and to the mobile device 102). The server device 302 can then use this unique server identifier as the caller identification (ID) when calling the mobile device 102 with a wake up call. By virtue of being unique, this caller ID can be recognized by the mobile device 102 as a wake up call from the server device 302, as described in more detail below.

Furthermore, in at least some embodiments, this caller ID can be formatted so as to avoid collisions with other calls, such as PSTN calls. By way of example and not limitation, one suitable format comprises making the first digit of the caller ID a zero "0". Finally, since all or a portion of the unique server identifier can be randomly generated at any specified time (such as at the time of device registration and/or prior to each wake up call) and is different for each mobile device, some protection against caller ID spoofing (attackers sending spurious wakeup calls) can be provided. Thus, in the example above, the last nine digits of the ten digit unique server identifier can be randomly generated while the first digit remains zero At operation 502, the server device 302 receives an incoming VoIP call from the soft phone 402 that is directed to the mobile device 102. Recall from above that while a soft phone is depicted/discussed in the context of this embodiment, any device capable of engaging (including initiating) in a VoIP call to the mobile device can be implemented. In response to receiving this VoIP call, the server device 302 informs the soft phone 402 that the call is being handled. This can be accomplished in any suitable manner such that a caller using soft phone 402 is adequately notified that the call has not been dropped or is otherwise unsuccessful. By way of example and not limitation, one suitable way is for the server device 102 to send ring tones to the soft phone 402. As discussed below, typically process 500 is completed within 7-10 seconds, which equates to approximately two ring tones or less. Accordingly, the time during which the caller is notified and expected to wait for process 500 to complete is relatively short.

At operation 504, the server device 302 utilizes the VoIP proxy table to match the mobile device's VoIP extension with the corresponding cell phone number, as described above. As noted above, in order for this match to be successful, the mobile device 102 must be registered with the VoIP proxy server on the server device 302. If the mobile device 102 is not registered, the server can respond in any suitable way, such as sending a busy tone to the soft phone 402 for instance. However, if the mobile device 102 is registered, the server device 302 can attempt to immediately initiate a direct call (wherein VoIP technology is used by the mobile device) between the soft phone 402 and the mobile device 102 over the IP-based network 320. The server device 302 can make this attempt before or concurrently with initiating a wake up call to the mobile device 102, as described in detail below. If the caller was on PSTN phone device instead of a soft phone, the VoIP proxy would complete the call at the VoIP to PSTN translation end-point, which could be the VoIP proxy itself.

For the purposes of this discussion, we will assume that to conserve battery power, the mobile device 102 does not have its Wi-Fi interface enabled such that a direct call (wherein VoIP technology is used by the mobile device) can immediately be initiated by the server device 302. As such, after matching the mobile device's VoIP extension with the corresponding cell phone number, the sever device 302 initiates a wake up call to the mobile device over the cellular network

440. Recall from above that for this call, server device 302 can use the unique server identifier described above as the caller ID for the wake up call. Furthermore, the server could use a unique data packet over the cellular data network, instead of a call, as the wake up signal. The data packet can have the same contents as the caller ID of the wake up call.

At operation 506, upon receiving the wake up call from the server device 102 via its cellular interface, the mobile device 102 traps the caller ID and checks to see if it matches the unique server identifier. If the caller ID does not match the unique server identifier, the mobile device 102 allows the call to ring on the device as a regular cellular call and does not enable its Wi-Fi interface. However, if the caller ID matches, the user device 102 enables its Wi-Fi interface. The mobile device 102 then uses its Wi-Fi interface to connect to an access point which provides the mobile device 102 with wireless access to the IP-based network, such as access point 422 above. As will be appreciated and understood by one skilled in the art, the mobile device 102 then associates/authenticates with the IP-based network 320 and uses DHCP to lease an IP address which it registers with the server device 302—unless it can utilize an existing registered IP address. This provides the mobile device 102 with the ability to participate in a direct call over the IP-based network 320.

Recall from above that the entire process 500 is typically completed within 5-7 seconds (two ring tones or less), during which the server device 302 informs the soft phone 402 that the call is being handled. In this regard, operation 506 is expected to account for a significant portion of this latency. To allow the operations in operation 506 enough time to complete, the server device 302 can make several consecutive wake up calls if there is no immediate response from the mobile device 102. In other words, the server device 302 does not immediately time out if there the mobile device 102 does not immediately respond.

At operation 508, the server device 302 sets up a direct VoIP-to-VoIP call, wherein VoIP technology is used by the mobile device, over the IP-based network 320 between the soft phone 402 (caller) and the mobile device 102 (callee). The server device 302 accomplishes this by sending the mobile device's credentials to the soft phone 402, as will be appreciated and understood by one skilled in the art. Note that once it is set up, the direct call is not relayed through the server device 302 and instead is implemented as a direct peer-to-peer call over the IP-based network 320—between the soft phone 402 and the mobile device 102. Finally, as discussed above, after the direct VoIP-to-VoIP call ends, the mobile device 102 disables its Wi-Fi interface to conserve power.

Possible Connectivity Scenarios

Figure 6:
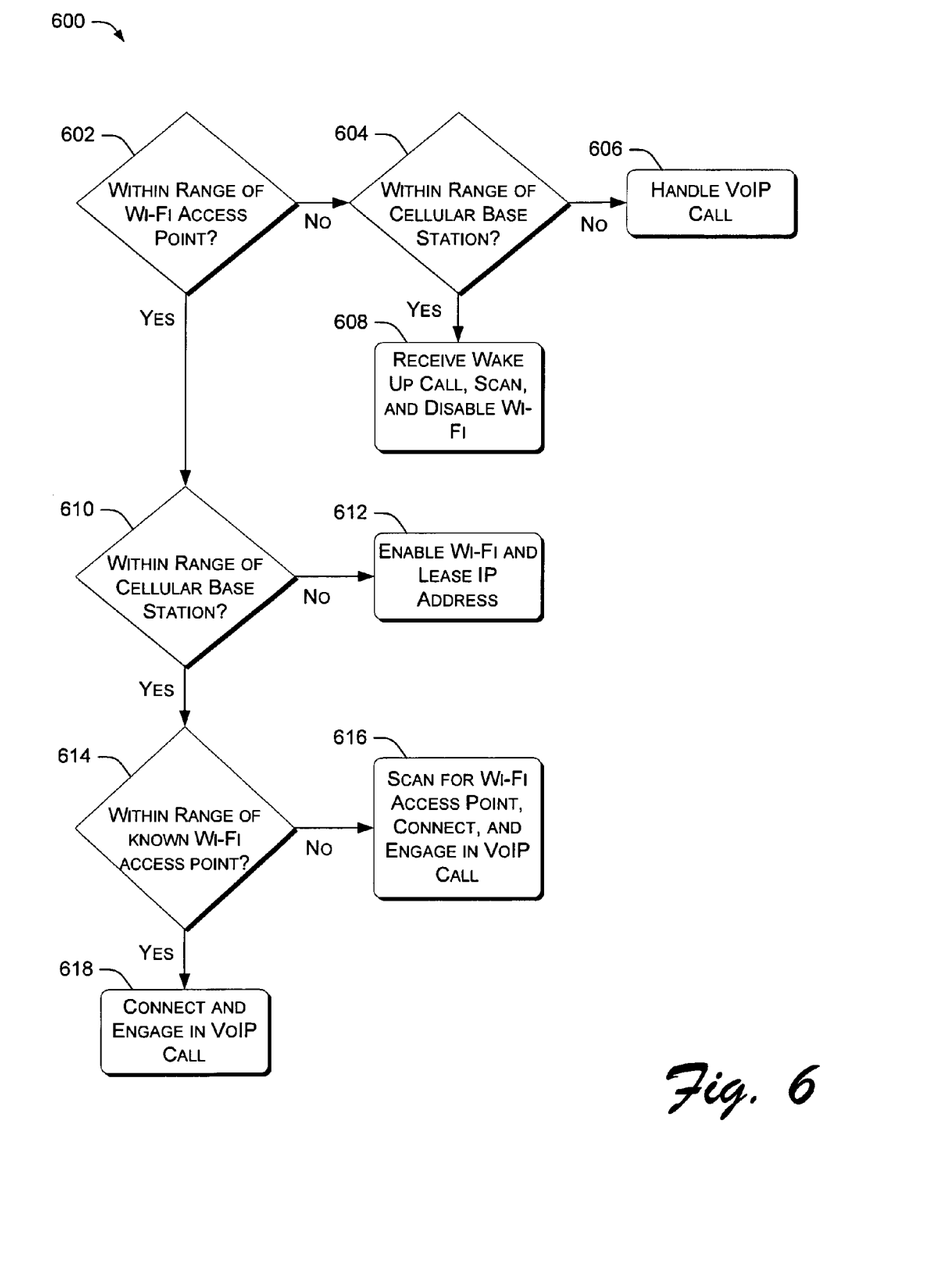
FIG. 6 illustrates an exemplary logical flow diagram depicting possible connectivity scenarios influencing a mobile device associated with a system implementing the disclosed energy management techniques.

FIG. 6 illustrates an exemplary logical flow diagram 600 depicting possible connectivity scenarios, and potential operations that can be performed in each scenario, influencing a mobile device associated with a system implementing the disclosed energy management techniques, such as system 400 above. It is to be appreciated and understood that these operations are examples of operations that can be performed in each scenario. As such, other suitable operations can be performed for each scenario without departing from the spirit and scope of the claimed subject matter. Recall that although this example is described in the context of transmitting VoIP calling, it is to be appreciated and understood that this constitutes but one example and is not to be used to limit the application of the claimed subject matter.

At block 602, a determination is made whether the mobile device is within range of an available Wi-Fi access point providing access to an IP-based network. If the mobile device is within range of an available Wi-Fi access point ("Yes"), then the flow diagram 600 proceeds to block 610, discussed below. However, if the mobile device is not within range of an available Wi-Fi access point ("No"), then block 604 determines whether the mobile device is within range of an available cellular base station.

At block 604, if the mobile device is within range of an available cellular base station ("Yes"), then the flow diagram 600 proceeds to block 608, discussed below. However, if the mobile device is not within range of a cellular base station ("No"), then at block 606 any suitable approach can be taken with respect to handling an incoming VoIP call directed to the mobile device. By way of example and not limitation, this can include informing the calling device that the mobile device is out of calling range and unavailable.

Referring now to block 608, if the mobile device is within range of an available cellular base station, the mobile device receives a wake up signal from a server device via its cellular interface. The server sends this wake up signal in response to receiving a VoIP call that is directed to the mobile device. If it recognizes the wake up signal, the mobile device enables its Wi-Fi interface and scans for available Wi-Fi access points. Since in this case there are no available Wi-Fi access points in range, the scan is unsuccessful and the mobile device does not obtain (lease) an IP address or register it with the server device. Accordingly, the mobile device eventually disables its Wi-Fi interface to conserve power. In this regard, any suitable approach can be taken for handling the incoming VoIP call received by the server device. By way of example and not limitation, this can include the sever device forwarding the VoIP call as a regular cellular call or requesting that the VoIP caller leave a voicemail for the user of the mobile device. Suitable approaches can be configured as part of the call handling rules for the mobile device at the server and can be customized based on user preferences.

Referring now to block 610, if the mobile device is within range of an available Wi-Fi access point, then block 610 determines whether the mobile device is within range of an available cellular base station. If the mobile device is within range of an available cellular base station ("Yes"), then the flow diagram 600 proceeds to block 614, discussed below. However, if the mobile device is not within range of an available cellular base station ("No"), then at block 612 the user device enables its Wi-Fi interface (assuming it was disabled to conserve power) and uses DHCP to obtain (lease) an IP address which it registers with the server device, as described above. In this way, the mobile device can still receive VoIP calls via the IP-based network. Since the power consumption of the Wi-Fi interface is significant, even when idle, the Wi-Fi interface is configured to use a conservative power mode when not engaged in communication, such as a mode defined standards set by the Institute of Electrical and Electronics Engineers (IEEE) for instance. Furthermore, in at least some embodiments, the mobile device turns off its Wi-Fi interface as soon as it detects that it is within range of an available cellular base station and de-registers its IP address with the server device. The mobile device thereafter reverts to using wake up calls from the server device as a stimulus to enable its Wi-Fi interface.

Referring now to block 614, if the mobile device is within range of an available cellular base station, then block 614 determines whether the mobile device is within range of a known Wi-Fi access point. In other words, a determination is made whether the mobile device has already connected to an access point and obtained (leased) an IP-address which has not expired and which has been registered with the server device. In this regard, the access point is known to the mobile device if it has cached the access point's information so that when the access point is in range, the mobile device can simply connect to it without having to scan for available access points. If the mobile is within range of a known Wi-Fi access point ("Yes"), then the process 600 proceeds to block 618, discussed below. However, if the mobile device is not within range of a known Wi-Fi access point ("No"), then at block 616 the mobile device receives the wake up signal from the server device via its cellular interface. The mobile device then enables its Wi-Fi interface and performs a scan to look for available access points that are in range. Since in this case there is an available access point in range, the mobile device connects to it, associates/authenticates with the IP-based network, and obtains (leases) an IP address which it registers with the server device, as described above. The mobile device and the calling device (or VoIP end-point) then engage in a direct VoIP-to-VoIP call (wherein VoIP technology is used by the mobile device), initiated by the server device, over the IP-based network.

Finally, referring now to block 618, if the mobile device is within range of a known Wi-Fi access point, then at block 618, the mobile device receives the wake up signal from the server device via its cellular interface and enables its Wi-Fi interface. Unlike in block 616 however, the mobile device does not need to perform a scan for available access points and instead connects to the access point whose information it has cached and registers the unexpired IP address with the sever device (if necessary). The mobile device and the calling device then engage in a direct VoIP-to-VoIP call (wherein VoIP technology is used by the mobile device) initiated by the server device, over the IP-based network. Note that by virtue of involving fewer steps, the operations in block 618 may be associated with less latency than the operations in block 616.

Enhanced Protection Against Caller ID Spoofing

Recall from above that in at least some embodiments, all or part of the unique server identifier (and thus at least a portion of the caller ID) can be randomly generated and is different for each mobile device. This provides some protection against an attacker spoofing the caller ID of a server device sending a wake up call to a mobile device, as described above. However, enhanced protection may be desired. By way of example and not limitation, one suitable way to provide enhanced protection is by authenticating the server device at the mobile device using standard cryptographic techniques. For example, in at least some embodiments, the S/KEY system is used. In this regard, and as will be appreciated and understood by one skilled in the art, the server device shares a different secret key with the mobile device. This key can be set up during registration, as described above. The first caller ID generated by the server is the last 9 digits of a one-way hash applied n times over the secret key, where n is a large number. This allows the first digit of the caller ID to be set to 0 to avoid collisions, as described above. Subsequent caller IDs generated by the server can be based on an n-1 times one-way hash of the secret key. The mobile device authenticates the caller ID from the server device by applying the one-way hash on the caller ID to see if it matches the previous caller ID. Given a strong hash function, this scheme can provide enhanced protection against spoofed caller ID attacks.

E-mailing and E-faxing

In addition to VoIP calling, the energy management techniques described above can be implemented in the context of other services such as e-mailing and e-faxing over an IP-based network. Specifically, a server device and a computing device implementing these techniques for VoIP calling can be configured to handle IP-based e-mailing and e-faxing in a similar manner. As such, a Wi-Fi interface on the mobile device can be automatically disabled when the device is not engaged in one of these services.

For example, when e-mailing and/or e-faxing via a Wi-Fi interface is initiated on the mobile device, or when the mobile device receives a wake up call associated with an incoming e-mail and/or e-fax via its cellular interface (which is in communication with a cellular network), the Wi-Fi interface can be automatically enabled. This wake up signal can be made by the server over the cellular network in response to an incoming e-mail and/or e-fax directed to the mobile device, and can be associated with a caller ID (or special data packet over the cellular data interface) that is distinguishable from a caller ID (or data packet over the cellular data interface) associated with a wake up call for an incoming VoIP call. As such, the mobile device can differentiate between an e-mail and/or e-fax wake up call and a VoIP wake up call. Furthermore, when the mobile device receives an e-mail and/or e-fax wake up call, it can connect to an IP-based network via its Wi-Fi interface and download or otherwise access the e-mail and/or e-fax. To avoid overloading the cellular network, the server device can be configured to distinguish between incoming e-mails and/or e-faxes and only send wake up signals for those e-mails and/or e-faxes with certain characteristics, such as those designated as high priority, originating from a specific sender(s), or the like.

Path-Aware Delivery

The energy management techniques described above can be leveraged in the context of path-aware delivery of IP-based data (such as e-mails and e-faxes for instance). Recall hat receiving IP-based data on a mobile device via a Wi-Fi interface is typically preferable to receiving it via a cellular data interface (with respect to cost, quality, etc). In this regard, and by utilizing a wake up call to activate an otherwise disabled Wi-Fi interface, preferences can be defined such that a cellular data interface on a mobile device is only used to receive data when the Wi-Fi interface is not available, or when the mobile device does not otherwise answer a wake up call. Furthermore, based upon which interface or path is available, these preferences can direct a server associated with the mobile device to respond in a correspondingly appropriate fashion. For instance, the server device can be directed to send only a portion of the data or even establish/coordinate an alternative means of communication.

By way of example and not limitation, in one embodiment a user of a mobile device (or system associated with the mobile device) can set path-specific delivery preferences for the delivery of large e-mail messages via the mobile device's Wi-Fi interface such that some e-mails are still delivered over the mobile device's cellular interface (connected to a cellular network associated with a cellular data plan) when the mobile device's Wi-Fi interface is not available. Typically, in this situation, the mobile device has not responded to a wake up call from a server device because an available Wi-Fi access point is not within range or cannot otherwise be accessed. In this regard, since the cost per megabyte (MB) size of receiving data such as e-mails is typically higher when it is received via the mobile device's cellular interface, the user can set the path-specific delivery preferences such that only part of the e-mail is delivered via the cellular interface.

For instance, assume that a server device associated with the mobile device receives a 5 megabytes (MB) e-mail directed to the mobile device. Using this approach, a user (or system) can set the path-specific delivery preferences or options such that the server device is directed to send the entire 5 MB e-mail when the mobile device responds to a wake up call (thus activating its Wi-Fi interface). However, if the mobile device does not respond (within a defined time period, as described above), only a portion of the entire 5 MB e-mail (a 1 MB header for instance) is sent to the mobile device via its cellular interface. In this way, the cost of delivery over the more expensive cellular network can be minimized.

A similar approach can be taken for delivery of time-sensitive and latency sensitive video to implement a "path-optimized" connectivity. Specifically, video teleconferencing is typically less troublesome and provides a better user experience when it is conducted over a Wi-Fi network rather than over a cellular network. This is due to several issues such as pricing, bandwidth, and latency. Accordingly, if the mobile device does not answer a wake up call from a server device which has received an incoming teleconference call directed to the mobile device, or otherwise indicates that it will not accept the incoming video teleconferencing call, a determination is made that a video teleconference call is not acceptable. As such, the server device can be directed to facilitate/establish an alternative means of communication (such as a VoIP call or cellular call for instance) instead of the video conference. This enables "path-aware" delivery options based on the availability of certain technically capable network transports. This "path-optimized" connectivity technique allows the mobile device to be used in a power-efficient manner without limiting the amount of data the server device can send or "push".

Instant Messaging

Existing Instant Messaging (IM) implementations require a central server (presence server) to send IM status updates to all clients over a data network (such as Wi-Fi, GPRS, etc.). For example, when an IM client changes their status (from online to away for example), the presence server sends an update to all the client's contacts that are online. In order for an IM client on a mobile device to receive updates about the status of its clients, it needs an IP-based data connection allowing it to receive data via its cellular or Wi-Fi interface. As noted above, receiving data on a mobile device via its cellular interface is typically more expensive than receiving data via its Wi-Fi interface. However, Wi-Fi interfaces quickly drain the battery power of a mobile device. Accordingly, the energy management techniques described above can be leveraged to support an IM updating scheme in which an IM client on a mobile device can receive up to date presence information for their contacts without requiring a data connection and without quickly draining the battery power of a mobile device.

In at least some embodiments, as will be appreciated and understood by one skilled in the art, this IM updating scheme works as follows. The presence server sends notifications to a client on a mobile device in the form of a ring over the cellular voice network (received on the mobile device via its cellular interface). The update message is encoded in the caller ID of the ring. The first digit of the caller ID is set to zero "0" to disambiguate it from a regular caller ID. Three digits can be used to support up to one thousand contacts, and one digit can support ten presence states (online, away, busy, in a meeting, etc.). Each caller ID can then encode the presence state of two contacts. Alternatively, two digits can be used to represent the contact (to support one hundred contacts), and one digit can be used to encode the state. This scheme can encode the state of three contacts in one caller ID. Using this scheme, a client will have the latest presence information of all its IM contacts. When the client wishes to interact with a contact, this scheme enables the Wi-Fi interface or the cellular data interface on the mobile device and completes the communication via the Wi-Fi interface.

As noted above, this IM updating scheme allows a client to receive updates for its IM contacts without requiring a cellular data connection, which is usually expensive. In addition, it significantly improves the battery lifetime of the mobile device. The Wi-Fi or cellular data interface is turned on only when it is being actively used by the client for IM communication. It does not have to be on to receive the IM status updates.

Unlicensed Mobile Access Technology

The disclosed energy management techniques can be implemented in the context of unlicensed mobile access (UMA) technology as well. Specifically, UMA technology allows a mobile device, such as a cell phone, to use a Wi-Fi connection if available, as will be appreciated and understood by one skilled in the art. In this regard, UMA technology requires that the mobile device's Wi-Fi interface stay enabled in order to receive incoming calls. Unfortunately, as noted above, keeping a Wi-Fi interface enabled can significantly reduce the mobile device's battery life. However, using the techniques described above, the mobile device's Wi-Fi device can be disabled unless the device is receiving, initiating or engaged in a call.

Conclusion

Although embodiments of techniques for increasing the battery life on a mobile device by decreasing the energy consumption of its wireless fidelity (Wi-Fi) interface have been described in language specific to structural features and/or methods, it is to be understood that the subject of the appended claims is not necessarily limited to the specific features or methods described. Rather, the specific features and methods are disclosed as exemplary implementations.

What is claimed is:

1. A method comprising:
   receiving, by a server device, data sent by a first mobile device directed to a second mobile device;
   sending, by the server device, a wake-up signal to the second mobile device, wherein the wake-up signal is sent by way of a cellular network;
   receiving, by the server device, an Internet Protocol (IP) address associated with the second mobile device from the second mobile device in response to sending the wake-up signal; and
   initiating, by the server device, direct communication between the first mobile device and the second mobile device via a wireless IP-based network by sending credentials of the second mobile device to the first mobile device in conjunction with receiving the data from the first mobile device.

2. The method as recited in claim 1, wherein the second mobile device receives the data by way of a Wireless Fidelity (Wi-Fi) interface.

3. The method as recited in claim 1 further comprising sending at least a portion of the data to the second mobile device if the second mobile device does not answer the wake-up signal.

4. The method as recited in claim 3, wherein the second mobile device receives the data by way of a cellular interface.

5. The method as recited in claim 3, wherein the at least a portion of data is less than the whole.

6. The method as recited in claim 1, wherein a user can define one or more preferences to receive the data when the second mobile device does or does not respond to the wake-up signal.

7. The method as recited in claim 1, wherein a system can define one or more preferences to receive the data when the second mobile device does or does not respond to the wake-up signal.

8. The method as recited in claim 1, wherein the data directed to the second mobile device is a teleconference call or data associated with an email.

9. A method for real time communication status updates comprising:
sending over a cellular network of a first client, a status of a second client;
receiving the status of the second client on a mobile device in the form of a ring signal over the cellular network to which a cellular interface connects, the status of the second client being encoded in a caller ID of the ring signal, the caller ID comprising:
a first digit set to zero;
a set of one or more digits wherein the set of one or more digits is specific to an identification of a contact as established by the first client; and
at least one digit determining a presence state of the contact.

10. The method as recited in claim 9, wherein the real time communication comprises instant messaging and the first and second clients comprise instant messaging clients.

11. The method as recited in claim 9 further comprising enabling the first client to interact with second client when the first client requests communication.

12. The method as recited in claim 11 further comprising communicating with the second client over an IP-based network by way of the cellular interface.

13. The method as recited in claim 11 further comprising communicating with the second client over an IP-based network by way of a Wireless Fidelity (Wi-Fi) interface.

14. The method as recited in claim 13, wherein the Wi-Fi interface is disabled at the conclusion of the communication with the second client.

15. A server device comprising:
one or more processors; and
one or more server applications executable by the one or more processors to:
receive data sent by a first mobile device directed to a second mobile device;
generate a caller identification that is unique with respect to the server device and the second mobile device;
send a wake-up signal to the second mobile device, wherein the wake-up signal is sent by way of a network other than an IP-based network and the wake-up signal includes the caller identification;
send a portion of the data over a switch-based network to the second mobile device when the second mobile device does not answer the wake-up signal; and
initiate direct communication between the first mobile device and the second mobile device by which to send the data over the IP-based network to the second mobile device when the second mobile device does answer the wake-up signal.

16. The service device of claim 15, wherein the data is associated with a particular type of communication and the caller identification is distinguishable from caller identifications associated with types of communication that are different from the particular type of communication.

* * * * *